June 23, 1931.   W. J. HUEBNER   1,811,631

SHADE CONTROLLING APPARATUS

Filed May 22, 1930   2 Sheets-Sheet 1

INVENTOR
William J. Huebner,
BY
Wm. H. Caufield
ATTORNEY

June 23, 1931.  W. J. HUEBNER  1,811,631
SHADE CONTROLLING APPARATUS
Filed May 22, 1930  2 Sheets-Sheet 2
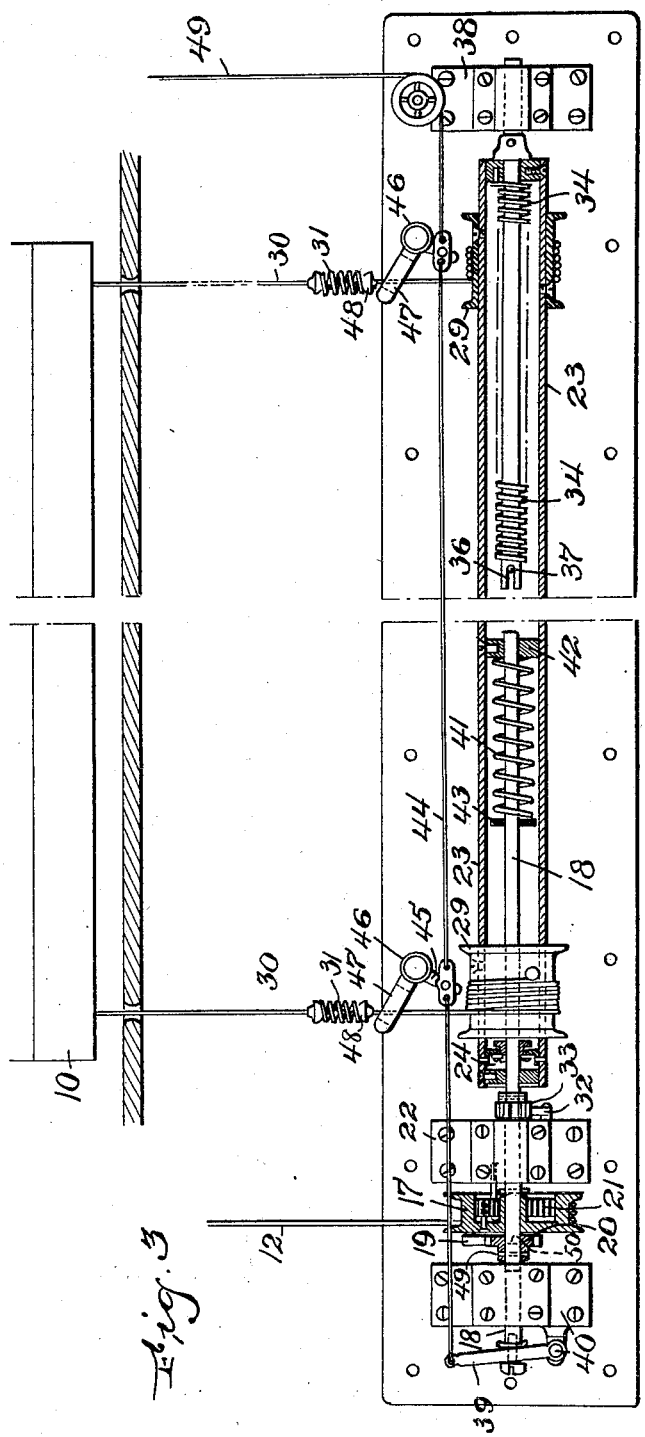
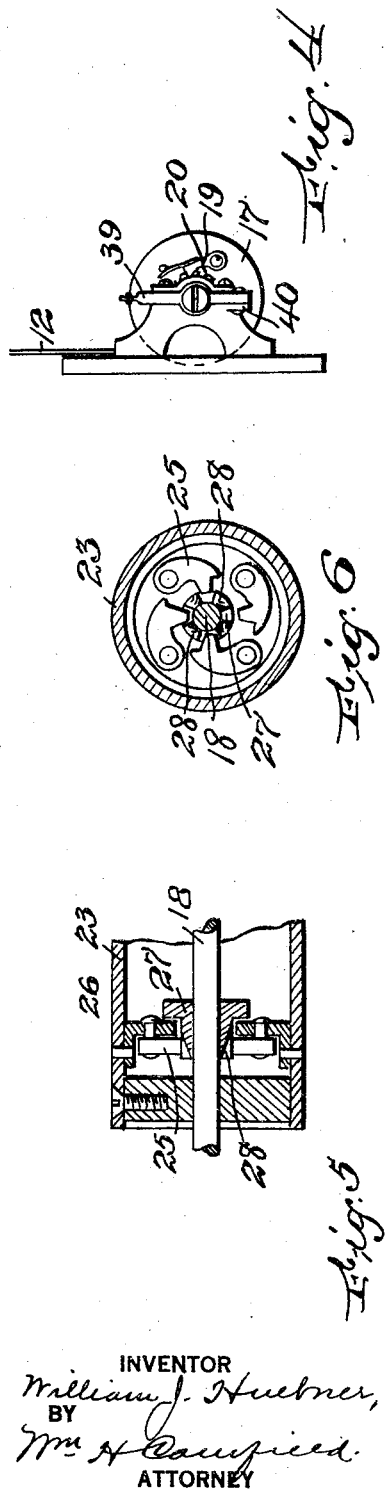
INVENTOR
William J. Huebner,
BY
Wm H Caufield
ATTORNEY Patented June 23, 1931

1,811,631

UNITED STATES PATENT OFFICE

WILLIAM J. HUEBNER, OF GARFIELD, NEW JERSEY

SHADE CONTROLLING APPARATUS

Application filed May 22, 1930. Serial No. 454,660.

This invention relates to an improved shade controlling apparatus by means of which a shade can be raised and lowered at will from a point remote from the shade.

The invention is adaptable to various situations but is particularly adapted for raising and lowering the shade or shades of an automobile from the driver's seat. For instance, the shade at the back of a sedan which shade is normally inaccessible from the front seat and uncomfortable to operate from the back seat, can, with my device, be operated by an occupant of either or of both seats. The invention is, of course, adaptable to cabin boats or in fact to any situation where remote control of the shade is desirable. Such manipulation of the shade is convenient as in a change of direction of the vehicle relative to the sun or the presence of glaring headlights from the rear.

Figure 1:
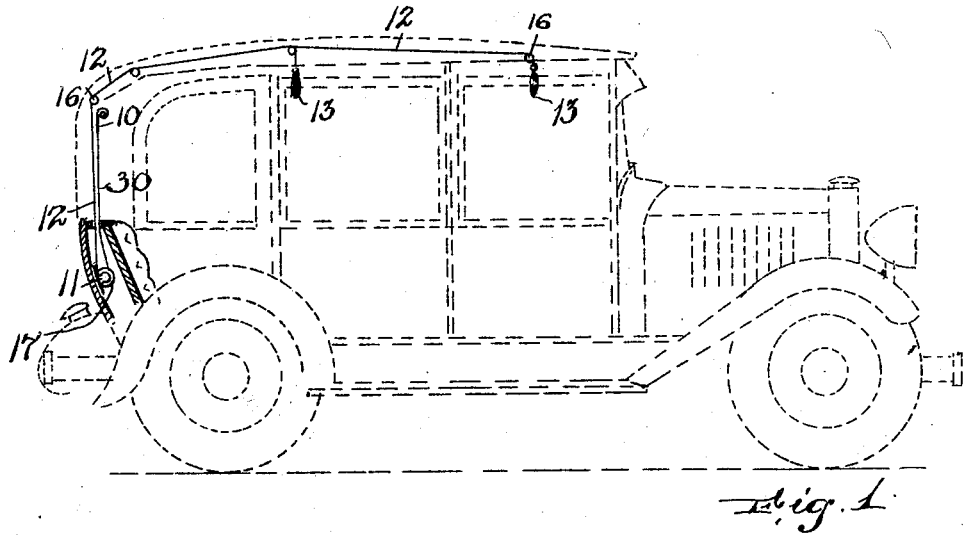
Figure 2:
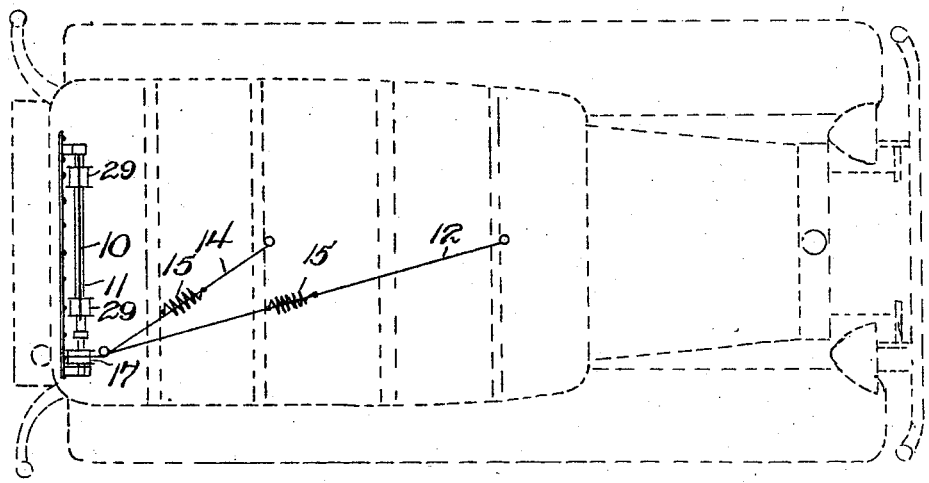

The invention is illustrated in the accompanying drawings in which Figure 1 is a general view illustrating the situation of the various parts of the device in an automobile. Figure 2 is a top view of the part shown in Figure 1. Figure 3 is a front view of the control mechanism with parts shown in section to more clearly illustrate the construction. Figure 4 is an end view of Figure 3. Figure 5 is an enlarged section of part of the release mechanism and Figure 6 is a front view of the detail shown in Figure 5.

The device is illustrated as installed for operating the rear curtain in a closed automobile. The curtain is shown at 10 and the operating mechanism is indicated by the numeral 11. It is operated by a cord or wire 12 which is provided with a handle or tassel 13 by means of which it can be pulled. If desired, a second strand 14 can be installed for operation from the rear seat. When this is done I install springs 15 which are secured at one end to the respective strand that it encircles and at the other end to a fixed point such as a roof strut. These springs keep the cords taut and returns each to its normal position and also keeps it there when the other is operated. The cords are, of course, concealed from view in the roof structure of the car and can be run over pulleys 16 at corners and then down through the back of the car to the operating mechanism which in this instance is placed in the space in back of the rear seat.

The operating mechanism is rotated in one direction by the strand which is arranged around a drum 17 which is fixedly secured against rotation relative to the spindle 18 but only in one direction by reason of the pawl 19 on the drum and the ratchet 20 on the spindle. The return of the drum 17 is caused whenever tension on the cord 12 is relaxed by the spiral spring 21 secured at one end to the drum and at the other end to the bearing 22. The spindle 18 is adapted to rotate the roller or barrel 23 by the pawl and ratchet connection 24. This is illustrated on a larger scale in Figures 4 and 5. The pawls 25 are pivoted on the flange 26 secured to the barrel 23 and ratchet 27 is secured to the spindle 18 and thus serve to connect them when the parts are in proper alignment. For reasons to be given hereinafter it is noted, however, that the spindle 18 has a limited longitudinal movement and the teeth of the ratchet 27 are bevelled as at 28 to allow the pawls to move into the notches of the ratchet when the two parts are moved together longitudinally relative to the spindle. On the barrel are secured the drums 29 which are wound with strings or thin wire connections 30 which in turn are secured to the bottom of the shade 10. The shade is wound on a spring roller (not shown) which roller exerts a constant tendency to roll the shade up. Springs 31 are inserted as connections in the strings 30 to take up excess pull after the shade is all the way down to prevent excess strain on the shade and to indicate by the increased resistance that tension should be relaxed by the operator. The barrel 23 rotates in bearings 22 disposed properly at points in its length. The spindle can not rotate in reverse direction due to the pawl 32 on a bearing 22 engaging the ratchet 33 on the spindle. The sliding of the spindle is for a short distance only so that the pawl 32 does not become disengaged from its ratchet. The barrel 23 is, as before stated, turned in one direction by the cord 12 and it is turned in the other direction when required by the spring 34 fastened at one end 35 to the barrel and on the other it is secured to the end 36 of the stem 37 which is held against rotation in the bearing 38.

A release mechanism is installed which comprises a lever 39 pivoted on the bearing 40 and engaging the end of the spindle 18 to push it in. The spindle is normally and yieldingly held in place by the spring 41 which abuts on the stop 42 in the barrel 23 and on the shoulder 43 on the spindle 18.

The lever 39 is operated to push in on the spindle when the wire 44 is pulled by the arms 45 of the bell cranks 46 when the arms 47 of the cranks 46 are engaged by the buttons 48 on the wires 30. The wire may be continued as at 49 to a separate release handle if desired.

The operation of the device is as follows: If the shade is up the cord 12 is pulled and this winds up the barrel 23 and the drums 29 and wires 30 pull down on the shade and when tension is relaxed the pawl 32 holds the barrel in place and the spring 21 rotates the drum 17 to pull the cord 12 to raise the tassel 13 to the ceiling.

When the shade is to be raised the tassel is again pulled to pull the curtain all the way down and then a trifle in excess. This causes the button 48 on each wire to engage a bell crank 46, the wire 44 is pulled and the lever 39 pushes in on the spindle 18 to disengage the ratchet 27 from the pawls 25. The spring 34 is then free to return the barrel to normal position and allow the spring on the curtain to roll the curtain up. The parts all resume their normal positions as the spring 21 rotates the drum 17 to its normal position and the spring 41 pushes the spindle 18 into place.

The connections between the spindle 18 and the drum 17 and the ratchet 20 are such as to allow the limited sliding movement of the spindle and I show pins 49 in slots 50 as typical of such connection.

Various changes can be made in the various parts without departing from the scope of my invention.

I claim:

1. A shade controlling apparatus comprising means for pulling on a shade for unrolling it, means for holding the shade in the unrolled position, and means for releasing the shade on a further movement of the pulling means.

2. A shade controlling apparatus comprising a rolled shade, a roller on which the shade is rolled, a spring connected to the shade to unroll it, a ratchet for holding the spring barrel, a trip for releasing the ratchet, a manually operable means for rolling up the spring barrel from a remote point, a latch for tripping the ratchet and a means operated from the connection between the shade and the spring barrel for operating the latch.

In testimony whereof he affixes his signature.

WILLIAM J. HUEBNER.